United States Patent
Mattesky

(10) Patent No.: US 6,391,933 B1
(45) Date of Patent: May 21, 2002

(54) FLEXIBLE, SUBSTANTIALLY OPEN CELLED POLYURETHANE FOAM AND METHOD OF MAKING SAME

(75) Inventor: Henry Mattesky, Roseland, NJ (US)

(73) Assignee: Magla World Wide, L.L.C., Vega Baja, PR (US)

( * ) Notice: Subject to any disclaimer, the term of this patent is extended or adjusted under 35 U.S.C. 154(b) by 0 days.

(21) Appl. No.: 09/403,122

(22) PCT Filed: Apr. 29, 1998

(86) PCT No.: PCT/US98/08605

§ 371 Date: Oct. 13, 1999

§ 102(e) Date: Oct. 13, 1999

(87) PCT Pub. No.: WO98/50446

PCT Pub. Date: Nov. 12, 1998

Related U.S. Application Data

(60) Provisional application No. 60/045,782, filed on May 6, 1997.

(51) Int. Cl.$^7$ ................................................ C08G 18/14
(52) U.S. Cl. .......................... 521/114; 521/155; 521/170; 521/172; 521/174
(58) Field of Search ................................. 521/114, 155, 521/170, 172, 174

(56) References Cited

U.S. PATENT DOCUMENTS 4,782,099 A * 11/1988 Dietrich et al. ............. 521/175
5,607,982 A * 3/1997 Heyman et al. ............ 521/155

* cited by examiner

*Primary Examiner*—John M. Cooney, Jr.
(74) *Attorney, Agent, or Firm*—Selitto, Behr & Kim

(57) ABSTRACT

Method of making substantially windowless open-celled polyurethane foams which have superior wiping properties is disclosed. The ingredients for making such foams comprise: a polyol, catalyst, silicon stabilizer, blowing agent, toluene diisocyananate and cell-openers and/or surfactants.

25 Claims, No Drawings

FLEXIBLE, SUBSTANTIALLY OPEN CELLED POLYURETHANE FOAM AND METHOD OF MAKING SAME this application is a 371 of PCT/US98/08605 filed Apr. 29, 1998, which claims benefit of Prov. No. 60/045,782 filed May 6, 1997.

BACKGROUND OF THE INVENTION

1. Field of the Invention

Polyurethane foam material having substantially windowless.cells. Certain flexible foams of this type have superior liquid absorbent and wiping properties.

2. Discussion of the Prior Art

Natural sponges have excellent wiping and absorbing qualities. They are however very expensive and are therefore seldom still used for ordinary domestic and industrial cleaning. Synthetic sponges both the so-called hydrophilic plastic foams and the expanded cellulosic structures, have been made by various techniques in an attempt to produce the optimum household cleaning and wiping sponge. While some of these materials have succeeded to a greater or lesser degree, they have proven in use, to be less than optimal products.

The manufacturing of flexible urethane foam and for that matter urethane foam sponges, is well known. Recently, foams with a viscoelastic property have been produced for the furniture industry in an attempt to duplicate the cushioning characteristics of polyester batting. These foams typically have a slower recovery rate than conventional foams and have a rubbery characteristic. This rubbery characteristic can be enhanced by lowering the TDI index. These foams were developed by Arco Chemical using their hydroxyl U-1000 polyol and these properties are now well known to the industry.

SUMMARY OF THE INVENTION

It was therefore found desirable to address these various shortcomings, to yield very practical, absorbent, cleaning devices. It has been found that by modifying urethane foam systems in quite a unique and unexpected manner, a highly satisfactory, absorbent and long lasting sponge can be produced having very practical wiping characteristics and yielding a product that has both absorbent and wiping properties heretofore not available.

Unexpectedly, it was found that slow recovery or low resilience or viscoelastic foams, when combined with cell openers and surfactants, yield a foam with excellent wiping characteristics. This is due to the drag produced as the foam is wiped across a surface yielding almost squeegee-like effect. Foams of this nature can be defined as those foams having a ball rebound value of less than 25% and preferably less than 20% using the Ball Rebound Test described in ASTM D3574.

There is provided a method of making polyurethane foams having substantially windowless cells, conventionally called open celled foams. The foams in this category which are formulated to be flexible are especially suitable as a sponge material because the are not only absorbent of the bulk liquid but also have superior wiping properties. This means that it essentially drys the previously wet surface as well. This latter property has heretofore not been readily available.

The ingredients for a formulation for making the foams of the present invention comprise: at least one polyol, at least one catalyst, a silicone foam stabilizer, a blowing agent, toluene diisocyanate, and a cell openers. Where flexible foams for sponges are desired a surfactant is also present. This surfactant may be itself act as the cell opener or "cell window remover" or may be used with cell openers of different chemistry. The method of making the foams with these novel combinations of ingredients is essentially conventional although there are certain modifications which will be set forth in detail below. In this method the ingredients are injected into a reaction chamber in at least two streams.

It has been found that surfactants, particularly wetting agents, incorporated into the aforementioned rubbery polyurethane foam formulation, increases the foams ability to wet out in water. This effect is heightened when less than the theoretical amount of toluene diisocyanate is used (theoretical amount is designated as TDI 100, i.e., 60% theory is TDI 60). Indexes in range of 50–90 are useful, suitably 65–85, 74–84 being preferred for sponge foams. Any surfactant could be used but surfactants that have good wetting and low foaming are advantageous. Actual surfactant levels will vary depending on many formulation variables such as density of final foam, polyol type or blend, the index and surfactant compatibility.

Not unexpectedly, surfactants do effect cell structure and degree of openness of the foam. Flexible foams are described as open cell foams, while ridged foam is described as closed cell foams. If a single cell of foam is described as having two parts, a frame and a window, an open cell foam is foam in which substantially all the windows are broken with some or all of the window missing. A closed cell foam can be described as a frame with a window that has no crack and is not broken. Closed cell flexible foam is a very unsatisfactory product for use as sponges, as the foam tends to shrink severely when cured. It is desirable when manufacturing flexible foam that most of the cell windows are at least broken so that when the foam is flexed or compressed, there is free movement of air between the cells. The degree of openness in flexible urethane foam is controlled by the balance of tin to amine in the conventionally used tin/amine catalyst and/or of the surfactants. A flexible reticulated foam is a foam whose cells have the windows substantially completely removed. Most often, reticulated foams are post treated foams, which remove the window by caustic treatment or rapid decompression. A properly formulated open cell flexible foam will have a combination of cells with "broken windows", partially removed "windows" and some cells with windows completely removed. It has been found that when producing an improved, highly absorbent sponge with good wiping properties, it is desirable to have a foam with at least 50% of the windows removed and preferably 100% of the windows removed.

Certain solvents can be used for this purpose. Methylene chloride also used as a blowing agent (to expand the foam, lowering density) is an example. It is known by anyone skilled in the art, that a properly formulated foam containing a balance of catalysts generally amine catalysts and tin catalysts and silicone cell stabilizers can often be "opened" a little further with the addition of 2–5%, based on polyol weight, of methylene chloride. This blowing agent used at these levels lowers the density of the open foam and at the same time, "breaks open more windows". Unfortunately, the use of methylene chloride has been banned in many states for environmental reasons.

As attempts were made to develop an open mostly reticulated sponge, it was discovered that a group of "safe" solvents, the terpenes, are very effective at low concentrations for opening and reticulating cells. A properly balanced foam can be further opened and reticulated with the addition of 0.05 to 5.0% suitably 0.1% to 2.0%. Care must be taken to use as little as possible depending on the formulation as excess amounts over that needed to open and reticulate cells can attack the foam leaving it weak with reduced tensile strength.

An improved method of producing an open reticulated foam structure was discovered. Secondary surfactants, namely surfactants which do not have hydroxyl groups reactable with TDI, and particularly those comprising silicone and siloxanes and polyalkyl -siloxanes and -silicone oils, were found to be very effective at extremely low concentrations. Particularly preferred cell openers comprise polydimethyl siloxane oil, polysiloxane emulsions, dimethyl silicone emulsion, and dimethylpolysiloxanes, particularly those modified with polyalkylene oxide. These may be used per se or in conjunction with other surfactant agents such as fatty acid esters, phosphate based esters as well as certain highly aromatic derivatives.

It was found that the best results are obtained when these anti-foams are extremely well dispersed in the foam system either dispersed in polyol or other components such as water. In one preferred option the cell opener is dispersed as a water/cell opener emulsion containing from about 10–about 40% by weight of opener dispersed to a globule size of less than about 20 microns, preferably about 0.1–about 5 microns. This emulsion is then dispersed into the polyol. Similarly the cell opener can be dispersed directly into a small quantity of polyol with a high-speed mixer or homogenizer to a similar globule size. This component is separately metered to finely adjust the degree of reticulation and openness. The finer the dispersion of oil, the greater the degree of foam openness or reticulation and the smaller the cell size of the foam.

Over time (several hours) this dispersion becomes less effective and the cell size of the foam increased and became irregular. This is thought to occur due to the agglomeration of the finely dispersed oil. As the size of the oil globule becomes larger, not only the cell window is destroyed, but also the frame structure is destroyed causing tiny voids in the foam. Custom emulsions of silicone oil in water and/or surfactant/polyol to keep the emulsions finely divided can be used or continuous high-speed agitation of this component will keep the oil finely dispersed.

The use of these cell openers is not limited to absorbent foams but also in more conventional foams where increased "breathability" is desired, Certain formulations are known to run "tight". That is they have a tendency for closed cells. As one example, the 'Softcel'™ series of foams by Arco Chemical are known in the literature to run tight. Cell openers allow the use of higher tin levels for more rapid cure and easier handling without shrinking.

As polyols there may be used polyether polyols of hydroxyl number from about 50 to about 200 having molecular weight of about 500 to about 6500, preferably about 750 to about 2000. Especially suitable are polytetramethylether glycol caprolactam bases esters and adipate and succinate polyester polyols, especially preferred are poly(oxypropylene)polyols of hydroxyl number between about 120 and 180 and equivalent weight of between 200 and 400. There are also, suitably, used high molecular weight polymer polyols of hydroxyl number about 20 to about 75 suitably in a molecular weight range of 1000 to 4000 and equivalent weight range of 300 to 1500. Especially preferred are polymer polyols yielding a rubbery quality in particular polymer graft polyols containing copolymerized styrene/acrylonitrile solids.

The compositions may also contain fillers of the type generally known to the urethane foam art.

Absorbent sponge foams with good wetting and wiping characteristics can be produced when in addition to toluene diisocyanate at a low TDI index and at least one polyol suitably a viscoelastic polyol, at least two of the following factors are present, namely a surfactant suitably a wetting agent, and a cell opener preferably silicone or siloxane containing anti-foam surfactant. These sponges also have low resilience qualities.

DESCRIPTION OF THE PREFERRED EMBODIMENTS

The foams of the present invention are produced by any of the standard methods of polyurethane foam production known to the art. These well known procedures are summarized below. According to the process of the present invention, each of the components are mixed together in a mixing chamber.

In one embodiment, each of the components is separately introduced into the mixing chamber. For example, each of the components can be introduced as a separate stream into the mixing chambers. Moreover, any means which is recognized in the art, such as a variable speed pump, can be employed to separately control the flow of each of the components into the mixing chamber in order to provide the desired product. In this way, the catalyst can be controlled according to operating conditions and most particularly, the cell opener component can be adjusted to optimally open the cells independent of the tin/amine ratio and silicone surfactant stabilizer.

In an alternative embodiment, one or more of the components can be premixed prior to introduction into the mixing chamber. As an example, the polyols including the surfactant polyol and surfactant can be premixed and introduced to the mixing chamber as one component. While not preferred, it is possible to combine all of the ingredients other than the diisocyanate and introduce just two components to the mixing stream. However, in most cases, it will be preferable to control the cell opener component as a separate feed stream. A less desirable method in most applications is to pre-react the diisocyanate with at least a portion of the polyol. The pre-polymer is then introduced to the mixing chamber along with the other components, either singularly or premixed, to produce a foam. Since an extra step is involved, the resulting foam is usually more expensive.

These processes described are not meant to be limiting to the present invention. Other methods of processing the materials described are known to those skilled in the art. As an example, in combining the above materials to a mixing chamber with liquid $CO_2$ under pressure and releasing those materials after mixing to at least partially froth the foam, or discharging the above materials to a large chamber and reducing the pressure in the chamber to aid in the expansion of the foam, are but two examples.

EXAMPLES

In the examples set forth below two polyols are used, suitably in similar proportions. A high load polymer polyol having a hydroxyl number of from about 20 to about 55, such as ARCOL HS-100, as well as a low molecular weight polyether polyol with a hydroxyl number of from about 50 to about 200, such as ARCOL Polyol U-1000 (both manufactured by ARCO Chemical Company).

The catalysts are a tin catalyst and an amine catalyst. The surfactant is a wetting agent, such as a Pluronic (manufactured by BASF).

The cell opener is a polydimethyl siloxane oil. It has been found useful to disperse the polydimethyl siloxane into water as an emulsion, this emulsion being further dispersed into the surfactant or the polyol. As blowing agent, water is be used. A variety of silicone oils, silicone emulsions and formulated silicone anti-foams were used and all were effective in opening the cells to a greater or lesser degree. Among them were SM2115 micro silicone emulsion, AF-60 Dimethylsilicone oil both GE Silicones; Additive 26, Additive 29, Additive 65, proprietary silicone oils from Dow Corning; SAG 30 and SAG 471 both silicone anti-foams from Witco Chemical Co.

In the following table there are set forth selection of foams produced by the process of the present invention. The ingredients as coded below are as follows:

ARCOL HS 100 Polyol: A polymer/graft polyol of poly(oxypropylene/ oxyethylene) polyol of hydroxyl number of about 52 and equivalent weight about 1080 containing dispersed high solids of copolymerized styrene/acrylonitrile, manufactured by ARCO Chemical Company;

ARCOL Polyol U-1000: a low molecular weight (about 1000 g/mol.) poly(oxypropylene)polyol with a hydroxyl number of about 170 and equivalent weight of about 330, manufactured by ARCO Chemical Company;

7057: A 3,000 mw Triol Polyol manufactured by Bayer Corp., Pittsburgh, Pa.

L-5770: A silicone foam stabilizer manufactured by ISI, Division of Witco Chemical.

L-620 Stabilizer: A silicone foam stabilizer manufactured by ISI, Division of Witco Chemical.

Niax A-1: A amine catalyst manufactured by OSI, Division of Witco Chemical.

Amine #5: A blend of:
  0.5 parts Niax Amine #77 manufactured by OSI, Division of Witco Chemical
  0.5 parts Dipropylene Glycol
  1.0 Dimethyl Amine
  4.0 3,000 mw Triol Polyol.

T-10 Tin Catalyst: Tin Octoate manufactured by M & T Chemical, Inc.

DEOA: Diethanolamine;

TDI: toluene diisocyanate;

Index: % by weight of TDI actually used compared to the stoichiometrically calculated theoretical amount;

Pluronic: Suitably 31R1, a block copolymer surfactant manufactured by BASF Corporation, Mount Olive, N.J.;

Tetronic 901: A tetrafunctional block copolymer surfactant manufactured by BASF, Mt. Olive, N.J.;

Surfynol: An emulsifiable nonionic nonfoaming or defoaming wetting agent manufactured by Air Products Corporation;

AF 60: A 30% emulsion of polydimethylsiloxane, manufactured by General Electric Corporation;

| INGREDIENTS | 601-E | 604-B | 604-D | 604-L |
|---|---|---|---|---|
| ARCOL HS 100 Polyol | 100 | 100 | 100 | 100 |
| ARCOL Polyol U-1000 | 100 | 100 | 100 | 100 |
| Water | 5.4 | 5.4 | 5.4 | 5.2 |
| Methylene Chloride | 5.0 | — | — | — |
| L-620 Stabilizer | 1.0 | 0.5 | 0.5 | 0.5 |
| Niax A-1 | 0.4 | 0.4 | 0.4 | 0.4 |
| T-10 Tin Catalyst | 0.9 | 0.7 | 0.8 | 0.5 |
| DEOA | 0.6 | 0.6 | 0.6 | 0.6 |
| TDI | 72 | 72 | 72 | 72 |
| Index | 81 | 79 | 81 | 83 |
| Pluronic | 75 | 50 | 50 | 50 |
| Surfynol SE-F | — | — | — | — |
| AF 60 | 0.2 | — | — | — |
| SM2115/Pluronic 1:5 | — | 3.9 | 2.5 | — |
| AF60/Pluronic 1:5 | | | | 1.0 |
| Density Kg/m$^3$ | 41.79 | 67.72 | 56.27 | 69.80 |
| Wetting in seconds | 10 @ 95% | 20 sec. | 60 @ 25% | 60 @ 60% |
| Wiping Comment | good | good | good | good |

| INGREDIENTS | 403-K | 603-I | 606-D | 604-M | 604-N | 605-D | 606-F |
|---|---|---|---|---|---|---|---|
| ARCOL HS 100 Polyol | 140 | 100 | 100 | 100 | 100 | 100 | 100 |
| Polyol 7057 3000MW | 60 | | | | | | |
| ARCOL Polyol U-1000 | | 100 | 100 | 100 | 100 | 100 | 100 |
| Water | 4.2 | 4.9 | 5.4 | 5.2 | 5.4 | 5.4 | 5.4 |
| Methylene Chloride | 30.0 | 5.0 | | — | — | — | — |
| L-5770 Stabilizer | 3.2 | | | | | | |
| L-620 Stabilizer | | 0.4 | 0.6 | 0.6 | 1.0 | 0.6 | 0.8 |
| Amine #5 | 2.0 | | | | | | |
| Niax A-1 | | 0.4 | 0.4 | 0.4 | 0.4 | 0.4 | 0.4 |
| T-10 Tin Catalyst | 0.6 | 0.4 | 0.3 | 0.5 | 0.5 | 0.3 | 0.4 |
| DEOA | | 0.6 | 0.8 | 0.6 | 0.6 | 0.8 | 0.7 |
| TDI | 53.4 | 72 | 72 | 72 | 72 | 72 | 72 |
| Index | 99 | 89 | 82 | 83 | 82 | 82 | 82 |
| Pluronic 31R1 | 40 | 50 | 50 | 50 | 50 | 50 | 50 |
| Dilimonene | 3.0 | | | | | | |
| Surfynol SE-F | 10.0 | — | — | — | — | — | — |
| AF 60 | | 0.2 | — | — | — | — | — |
| Tetronic 901 | | 1.0 | | | | | |
| SM2115/Pluronic 1:5 | — | — | — | — | — | — | — |
| AF60/Pluronic 1:5 | | | 0.2 | 0.5 | 0.5 | 0.2 | 0.4 |
| AF60/H$_2$O/Pluronic 1:2:10 | | 0.5 | | | | | |

-continued

| INGREDIENTS | 403-K | 603-I | 606-D | 604-M | 604-N | 605-D | 606-F |
|---|---|---|---|---|---|---|---|
| Density Kg/m$^3$ | 39.22 | 36.34 | 45.15 | 57.32 | 58.28 | 44.19 | 44.19 |
| Wetting in seconds | 45 sec | 60 @ 30% | 60 @ 50% | 60 @ 20% | 60 @ 75% | 60 @ 60% | 10 sec. |
| Wiping | fair/poor | good | good | good | good | good | good |
| Comment | 100% reticutated | very open | | | | | |

Production Run

| INGREDIENTS | 130 Parts | 126 (parts) |
|---|---|---|
| ARCOL HS 100 Polyol | 50.0 | 50 |
| ARCOL Polyol U-1000 | 50.0 | 50 |
| Water | 3.1 | 3.1 |
| Reactint Yellow 2238 | 0.3 | 0.3 |
| L-620 Stabilizer | 0.6 | 0.6 |
| Amine Niax A1 0.04 parts 33LV 0.12 parts (preblend) | 0.8 | 0.7 |
| T-10 Tin Catalyst | 0.35 | 0.35 |
| DEOA -LF (15% H$_2$O) | 0.3 | 0.3 |
| TDI | 33.31 | 36.06 |
| Index | 70 | 80 |
| Pluronic 31R1 | 25.0 | 25.0 |
| Air (in litres/min) | 56 | 56 |
| Pluronic 0.5714 parts AF60 0.0114 parts (preblend) | 0.72 | 0.6 |
| Mix speed rpm | 3500 | 3500 |
| Density Kg/m$^3$ | 35.00 | 35.22 |
| Wetting in seconds | instant 1 sec | ~5 sec |

The #126 foam rose smoothly to yield a sponge which sank in water in about 5 seconds. It had a very open cell, substantially windowless, structure and excellent wiping qualities. The #130 foam rose smoothly, was more open than #126, has excellent wiping qualities and has small tears throughout foam.

I claim:

1. A method of making a polyurethane foam having cells with at least 50% of the windows removed and a ball rebound value of less than 25% in the Ball Rebound Test of ASTM D3574, wherein the ingredients for a formulation for making said foam comprise: at least one polyol having an equivalent weight in the range between about 200 to about 400, at least one catalyst, a blowing agent, a silicone foam stabilizer, toluene diisocyanate, and a cell opener selected from the group consisting of surfactants devoid of hydroxyl groups, wherein said ingredients are injected into a reaction chamber.

2. A method of making a polyurethane foam having cells with at least 50% of the windows removed a ball and a rebound value of less than 25% in the Ball Rebound Test of ASTM D3574, wherein the ingredients for a formulation for making said foam comprise: at least one polyol having an equivalent weight in the range between about 200 to about 400, at least one catalyst, a blowing agent, a silicone foam stabilizer, toluene diisocyanate wherein the amount of toluene di-isocyanate is between 50 and 90% of the stoichiometrically required amount, and a cell opener selected from the group consisting of surfactants devoid of hydroxyl groups, wherein said ingredients are injected into a reaction chamber.

3. The method of claim 1 wherein the ingredients for a formulation for making said foam comprises further surfactants.

4. The method of claim 3 wherein said further surfactants are wetting agents.

5. The method of claim 1 wherein the cell opener comprises a member of the group consisting of silicone and siloxane antifoam surfactants and polyalkyl-siloxane and -silicone oils.

6. The method of claim 5 wherein the cell opener comprises a member selected from the group consisting of a polydimethyl siloxane oil, polysiloxane emulsions, dimethyl silicone emulsion, and dimethylpoly-siloxanes.

7. The method of claim 1 wherein there is utilized a low molecular weight polyether polyol of hydroxyl number from about 50 to about 200.

8. The method of claims 1 wherein there is further utilized high molecular weight polymer graft polyol of hydroxyl number from about 20 to about 75.

9. The method of claim 8, wherein the equivalent weight of the high molecular weight polymer graft polyol is in the range of from about 300 to about 1500.

10. The method of claim 1 wherein the amount of toluene di-isocyanate is between about 65 and 85% of the stoichiometrically required amount.

11. The method of claim 10 wherein the amount of toluene di-isocyanate is between about 74 and 84% of the stoichiometrically required amount.

12. The method of claim 1 wherein the catalyst comprises a tin catalyst and an amine catalyst.

13. The method of claim 3 wherein the amount of surfactant is in the range of 5–40% by weight of the entire formulation.

14. The method of claim 13 wherein the amount of surfactant is in the range of 10–20% by weight of the entire formulation.

15. The method of claim 1 additionally comprising a filler.

16. The method of claim 1 wherein the blowing agent is water.

17. The method of claim 1 wherein the cell opener is dispersed into water as an emulsion containing between 10 and 40% by weight thereof at a globule size of below about 20 microns and said emulsion being further dispersed into the polyol.

18. The method of claim 17 wherein the cell opener is dispersed into the polyol a globule size of below about 20 microns.

19. The method of claim 18 wherein the globule size is in the range of from about 0.1–about 5 microns.

20. The method of claim 1 wherein the amount of cell opener is between 0.002 and 0.5% by weight of the weight of the polyol.

21. An open celled polyurethane foam material made by the method of claim 1 having cells with at least 50% of the windows removed.

22. A flexible, open celled polyurethane foam sponge material made by the method of claim 2, having cells with at least 50% of the windows removed and a ball rebound value of less than 25% in the Ball Rebound Test of ASTM D3574, whereby the foam sponge material has superior wiping properties.

23. A flexible, open celled polyurethane foam sponge material made by the method of claim 3, having cells with at least 50% of the windows removed and a ball rebound value of less than 25% in the Ball Rebound Test of ASTM D3574, whereby the foam sponge material has superior wiping properties.

24. A flexible, open celled viscoelastic polyurethane foam, comprising cells with at least 50% of the windows removed and cell opening surfactants devoid of hydroxyl groups, said foam having a ball rebound value of less than 25% in the Ball Rebound Test of ASTM D3574.

25. A flexible, open celled viscoelastic polyurethane foam, comprising cells with at least 50% of the windows removed and cell opening surfactants devoid of hydroxyl groups, said foam being produced from an original charge of toluene di-isocyanate of between 50 and 90% of the stoichiometrically required amount, and having a ball rebound value of less than 25% in the Ball Rebound Test of ASTM D3574.

* * * * *

UNITED STATES PATENT AND TRADEMARK OFFICE
CERTIFICATE OF CORRECTION

PATENT NO. : 6,391,933 B1  Page 1 of 1
DATED : May 21, 2002
INVENTOR(S) : Henry Mattesky It is certified that error appears in the above-identified patent and that said Letters Patent is hereby corrected as shown below:

Column 1,
Lines 12-13, between "window-less" and "cells", delete "." and insert a space.

Signed and Sealed this

Nineteenth Day of August, 2003

JAMES E. ROGAN
*Director of the United States Patent and Trademark Office*